United States Patent
Wang et al.

(10) Patent No.: US 11,360,832 B2
(45) Date of Patent: Jun. 14, 2022

(54) OPERATION METHOD OF ROBOT OPERATING SYSTEM AND A ROBOT CONTROL METHOD

(71) Applicant: HRG International Institute for Research & Innovation, Hefei (CN)

(72) Inventors: Fei Wang, Hefei (CN); Liang Ding, Hefei (CN); Kerui Xia, Hefei (CN); Zhenzhong Yu, Hefei (CN); Yanan Zhang, Hefei (CN); Qi Hou, Hefei (CN); Chao Peng, Hefei (CN); Taogeng Zhang, Hefei (CN); Xiaolong Li, Hefei (CN)

(73) Assignee: HGR INTERNATIONAL INSTITUTE FOR RESEARCH & INNOVATION, Hefei (CN)

( * ) Notice: Subject to any disclaimer, the term of this patent is extended or adjusted under 35 U.S.C. 154(b) by 81 days.

(21) Appl. No.: 17/031,903

(22) Filed: Sep. 25, 2020

(65) Prior Publication Data
US 2021/0011786 A1 Jan. 14, 2021

(30) Foreign Application Priority Data
Jun. 15, 2020 (CN) .......................... 202010542203.9

(51) Int. Cl.
*G06F 9/54* (2006.01)
*G06F 11/30* (2006.01)

(52) U.S. Cl.
CPC ............ *G06F 9/545* (2013.01); *G06F 11/302* (2013.01)

(58) Field of Classification Search
CPC ............................... G06F 9/545; G06F 11/302
See application file for complete search history.

(56) References Cited

U.S. PATENT DOCUMENTS

| 2017/0203436 | A1* | 7/2017 | Wei | ..................... G06F 9/4887 |
| 2019/0317785 | A1* | 10/2019 | Wen | ..................... G06F 9/45558 |
| 2020/0174669 | A1* | 6/2020 | Wen | ..................... G06F 3/064 |
| 2020/0183795 | A1* | 6/2020 | Xie | ..................... G06F 12/109 |

\* cited by examiner

*Primary Examiner* — Tuan C Dao

(57) ABSTRACT

An operation method of robot operating system and a robot control method are provided in this invention. The operation method of robot operating system includes steps of: monitoring an operating state of the Linux kernel through the security kernel when the security kernel and the Linux kernel of the robot operating system are both started; and hosting the Linux kernel through the security kernel when the Linux kernel runs abnormally or crashes. The technical scheme of the present invention is able to improve stability and safety of the robot operation.

9 Claims, 5 Drawing Sheets

--- monitoring an operating state of the Linux kernel through the security kernel when the security kernel and the Linux kernel of the robot operating system are both started hosting the Linux kernel through the security kernel when the Linux kernel runs abnormally or crashes

OPERATION METHOD OF ROBOT OPERATING SYSTEM AND A ROBOT CONTROL METHOD

BACKGROUND OF THE INVENTION

Field of the Invention

The present invention relates to the technical field of robots, in particular, to an operation method of robot operating system and a robot control method.

Description of Related Art

At present, most industrial robot operating systems are designed and developed for specific scenarios, specific functions and specific environments. The requirements of different robot operating systems are different, for example, requirements for the stability of the operating system from the versatility and real-time performance. However, most robot operating systems lack effective tracking methods for system operation failures or even the operating system's own breakdown caused by internal abnormalities of the system, which makes it difficult to accurately locate the operating system failures, which affects the stability of the robot operating system.

SUMMARY OF THE INVENTION

Aiming at the shortcomings of the prior art, the present invention proposes a robot operating system and an operation method thereof.

According to a first embodiment, an operation method of a robot operating system is provided in the present invention. The robot operating system includes a security kernel and a Linux kernel. The security kernel and the Linux share the same physical memory but run in different memory spaces. The method includes the following steps: monitoring an operating state of the Linux kernel through the security kernel when the security kernel and the Linux kernel of the robot operating system are both started; and hosting the Linux kernel through the security kernel when the Linux kernel runs abnormally or crashes.

Further, a startup process of the security kernel and the Linux kernel includes: loading a multi-operating system startup program through a basic input/output system; booting the security kernel to start through the multi-operating system startup program; and booting the Linux kernel to start through the security kernel.

Further, the step of booting the security kernel to start through the multi-operating system startup program includes: parsing an elf file of the security kernel through the multi-operating system startup program; and re-locating each segment of the elf file according to header information of the elf file when a validity of a Multiboot header of the elf file is confirmed, so that the security kernel runs on a first physical memory address of a physical memory.

Further, the step of booting the Linux kernel to start through the security kernel includes: loading the Linux kernel through the security kernel, reading an image file of the Linux kernel from a file system, and decompressing the Linux kernel to a second physical memory address of the physical memory; and loading an initial RAM disk of the Linux kernel to the second physical memory address through the security kernel according to a definition of a boot menu.

Further, when operating on a multi-core processor having a master core and a slave core, the step of booting the Linux kernel to start through the security kernel includes: residing the security kernel on the master core, and booting the slave core to load the Linux kernel by the master core.

Further, the step of monitoring an operating state of the Linux kernel through the security kernel includes: the security kernel and the Linux kernel respectively mapping an incoming address space to their own physical memory addresses; and obtaining system information of the Linux kernel through the security kernel, wherein the system information comprises an interrupt vector table, a process scheduling list, and a memory descriptor of an initial process, and the system information obtained by the security kernel is used to derive the operating state of the Linux kernel.

Further, the step of hosting the Linux kernel through the security kernel includes: hosting the Linux kernel by the security kernel according to the system information of the Linux kernel before the abnormality or crash obtained by the security kernel when the Linux kernel runs abnormally or crashes.

Further, the operation method further includes the following step: the Linux kernel communicating with an external network through the security kernel.

Further, the step of the Linux kernel communicating with an external network through the security kernel includes: the security kernel receiving a data message from the Linux kernel directed to the external network, and forwarding the data message to the external network; and the security kernel receiving a data message directed to the Linux kernel from the external network, and after filtering through a firewall, forwarding the filtered data message to the Linux kernel.

The operation method of robot operating system provided by the invention has the following beneficial effects: the robot operating system includes a security kernel and a Linux kernel, which share the same physical memory but run in different memory addresses, so that the operating environments for the two kernels are isolated from each other. The operating state of the Linux kernel can be monitored through the security kernel, so that the security kernel will not be affected when the Linux kernel runs abnormally or crashes. In one aspect, the Linux kernel may be hosted through the security kernel. In another aspect, the operating state of the Linux kernel before the abnormality or crash may be derived from the information about the operating state of the Linux kernel recorded by the security kernel, so as to realize the effective tracking of system failure, thereby improving the stability and safety of the overall operation of the system.

According to a second embodiment, a robot control method is provided in the present invention. The method includes steps of: executing a setting action of the robot through the Linux kernel of the robot operating system; hosting the Linux kernel through the security kernel of the robot operating system based on the above operation method of robot operating system when the Linux kernel runs abnormally or crashes to keep the setting action as the state before the Linux kernel runs abnormally or crashes or return the robot gently to an initial position for executing the setting action.

The setting action includes a welding action of a welding robot, a punching action of a punching robot, and a cutting action of a cutting robot.

According to a third embodiment, a computer readable storage medium is provided in the present invention, stored with computer programs, which, when performed by a processor, achieves the operation method of robot operating system as described above and the robot control method as described above.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are some embodiments of the present invention. For those of ordinary skill in the art, other drawings can be obtained based on these drawings without creative labor

DESCRIPTION OF THE PREFERRED EMBODIMENTS

The principles and features of the invention will be described below with reference to the accompanying drawings. The examples cited are only used to explain the invention and not used to limit the scope of the invention.

A robot operating system of an embodiment of the invention includes a security kernel and a Linux kernel, which share a physical memory and run on different physical memory addresses respectively.

In the following description, the security kernel may also be called "SafetyOS", and the Linux kernel may be called "Linux".

Linux mainly runs applications to execute the setting action of the robot. It should be noted that currently the main Windows used is a closed system, which has to spend a lot of energy to develop applications based on Windows related protocols in application scenarios such as multi-node robots communicating. With the open source Linux, applications may be flexibly customized, and the staff has to spend less energy, which may improve work efficiency.

Figure 1:
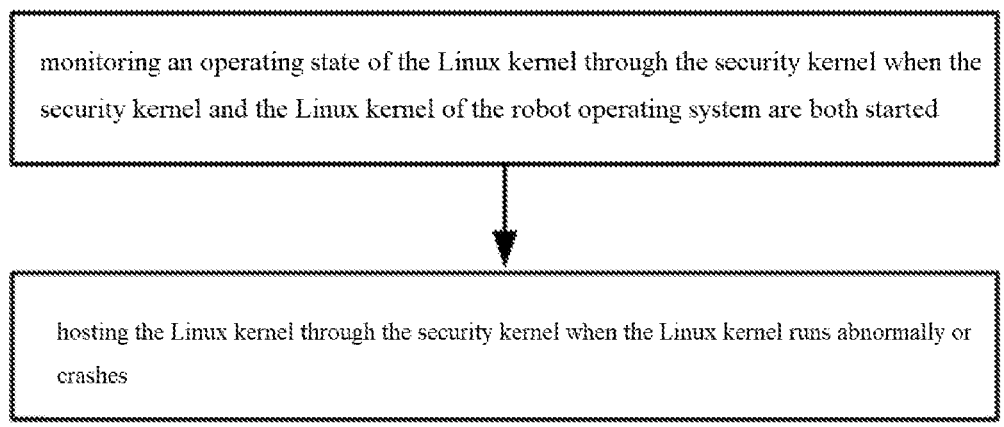
FIG. 1 is a flowchart of an operation method of a robot operating system according to an embodiment of the present invention.

An operation method of robot operating system of another embodiment of the invention is applied to the above robot operating system, as shown in FIG. 1, and the method includes the following steps: an operating state of the Linux kernel is monitored through the security kernel when the security kernel and the Linux kernel of the robot operating system are both started; and the Linux kernel is hosted through the security kernel when the Linux kernel runs abnormally or crashes.

Specifically, in the field of robotics, such as industrial welding robots, the welding actions may be executed through Linux applications. However, if the Linux kernel is abnormal or crashed, on the one hand, the visual interface of the existing robot operating system will mainly be displayed in a blue or black screen, which is not conducive to the operator to accurately determine the cause of the fault. On the other hand, the system process may be chaotic at this time, causing the welding arm of the welding robot to lose control, which will cause great safety hazards to peripheral equipment and personnel.

In this embodiment, the robot operating system includes a security kernel and a Linux kernel, which share the same physical memory but run in different memory ranges, so that the operating environment for the two are isolated from each other, and the operating state of the Linux kernel can be monitored through the security kernel, and so that the security kernel will not be affected when the Linux kernel runs abnormally or crashes. In one aspect, the Linux kernel may be hosted through the security kernel, so as to maintain the welding robot arm in the state before the system failure, or turn off the welding gun and slowly return the welding robot arm to the initial position before welding. In another aspect, the operating state of the Linux kernel before the abnormality or crash may be derived from the information about the operating state of the Linux kernel recorded by the security kernel, so as to realize the effective tracking of system failure, for example, the staff may quickly infer the cause of the failure through the process information of the Linux kernel before the failure recorded in the security kernel and debug and upgrade related applications, thereby improving the stability and safety of the overall operation of the system.

Optionally, a startup process of the security kernel and the Linux kernel includes the following steps:

after power-on, the basic input output system (BIOS) completes the self-check of peripherals and hardware, and loads the multi-operating system boot program (GRUB, GRand Unified Bootloader);

the security kernel is booted to start through the multi-operating system startup program; and the Linux kernel is booted to start through the security kernel.

The security kernel and the Linux kernel are independent of each other, but the boot priority of the security kernel is higher than that of the Linux kernel. Therefore, the security kernel is started before the Linux kernel, and after GRUB loads the security kernel, the security kernel loads the Linux kernel.

Optionally, the booting the security kernel to start through the multi-operating system startup program includes the following steps:

an elf file of the security kernel is parsed through the multi-operating system startup program; and each segment of the elf file is relocated according to header information of the elf file when the validity of a Multiboot header of the elf file is confirmed, so that the security kernel runs on a first physical memory address of a physical memory.

Optionally, the booting the Linux kernel to start through the security kernel includes the following steps:

the Linux kernel is loaded through the security kernel, an image file (bzImage) of the Linux kernel is read from a file system, and the Linux kernel is decompressed to a second physical memory address of the physical memory according to the image file, such as decompressing the Linux kernel to a memory address above 0x100000 or a designated memory address; and an initial RAM disk (initrd) of the Linux kernel is loaded to the second physical memory address through the security kernel according to a definition of a boot menu, i.e., loading the initrd of the Linux kernel to a designated memory address through the security kernel.

In order to ensure the isolation between the operating environment of the security kernel and the operating environment of the Linux kernel, the two run in different physical memory segments.

Optionally, when operating on a multi-core processor including a master core and a slave core, the booting the Linux kernel to start through the security kernel includes the following steps:

the security kernel is resided on the master core, and the slave core is booted to load the Linux kernel by the master core.

Figure 2:
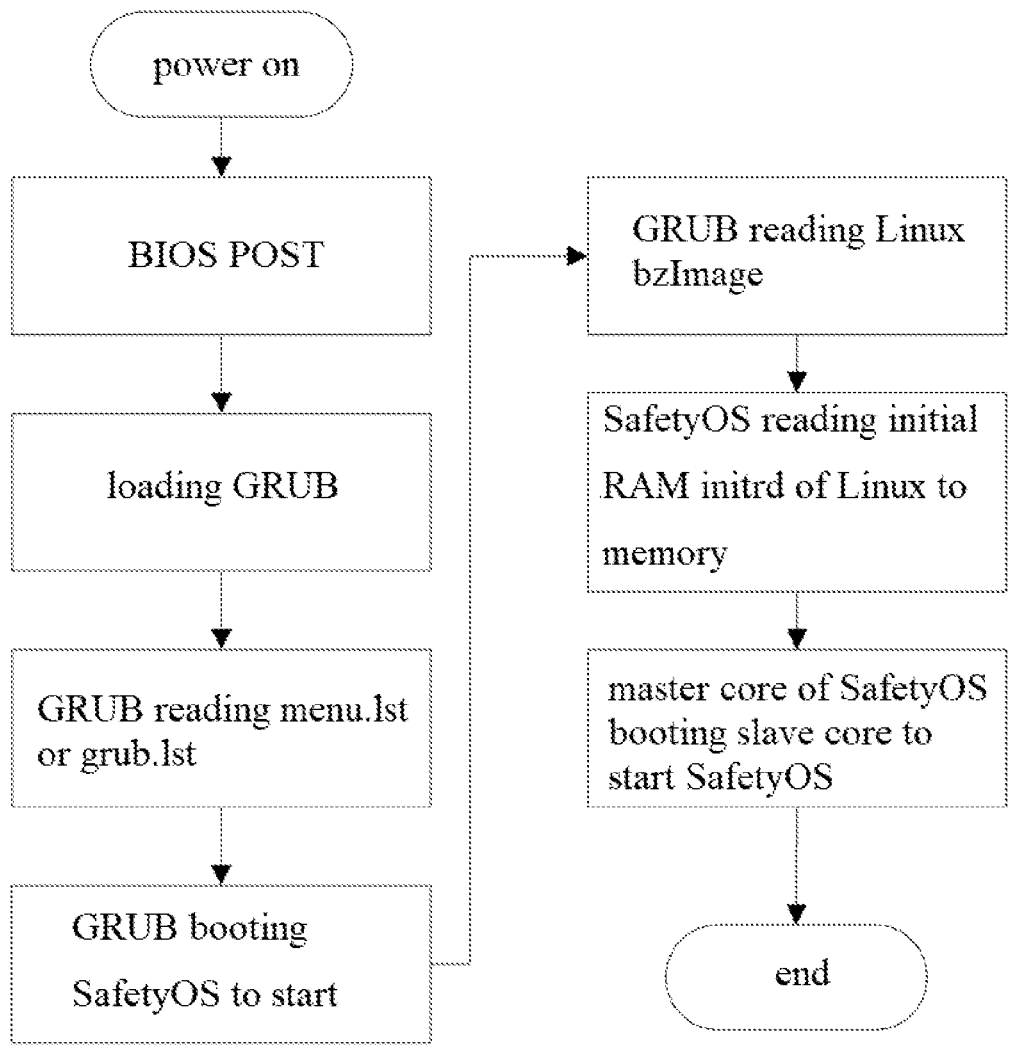
FIG. 2 is a diagram of implementing system startup according to an embodiment of the present invention.

Specifically, as shown in FIG. 2, when the system is powered on, it first performs the BIOS POST, which is the power-on self-check of the basic input and output system, and loads GRUB through the BIOS to boot.

Then, SafetyOS is booted to start through GRUB.

More specifically, the process may include the following steps:

the GRUB reads the first 512 bytes of the disk (track 0, side 0, sector 1 of the hard disk, called MBR (Master Boot Record), also known as bootsect); the MBR consists of a part of Bootloader's boot code, partition table and magic number;

a file system format of the SafetyOS is identified; i.e., GRUB recognizes the SafetyOS file system;

a SafetyOS system boot menu is loaded (menu.1st or grub.1st), and the SafetyOS image is loaded, followed by jumping to the SafetyOS execution;

the elf file of the SafetyOS is parsed through GRUB's kernel command to determine the validity of its Multiboot header, and after the completion of the validity and complete judgment, each segment of the elf file of the SafetyOS is relocated according to the header information of the elf file; the SafetyOS may run in, for example, a high memory address; and finally, the Linux is booted to start through the SafetyOS.

More specifically, the process may include the following steps:

after SafetyOS is started, the Linux bzImage is read from the file system and the kernel is decompressed to the memory, with an address that may be above 1M (0x100000); and according to the definition of the boot menu, the SafetyOS loads the initial RAM disk initrd of the Linux to the specified memory location.

On a multi-core CPU, SafetyOS resides on the master core, and the slave core is booted by the master core to load the Linux. More specifically, it is necessary to send the INIT IPI (inter processor interrupt) command to the slave core first, and then send the STARTUP IPI command twice in a row. Both the INIT IPI command and the STARTUP IPI command are fixed commands with parameters, which are sent by means of inter-core interruption. The INIT IPI command may make the slave core automatically perform a reset operation and complete the hardware required procedures such as power-on self-check. The STARTUP IPI command may specify the content and address of the instruction that the slave core jumps to real mode execution. At this time, the slave core jumps to the memory address after decompression of the bzImage, and executes the Linux startup in a protected mode. Finally, the startups of the SafetyOS and the Linux are completed.

Optionally, the monitoring an operating state of the Linux kernel to start through the security kernel includes the following steps:

the security kernel and the Linux kernel respectively map an incoming address space to respective physical memory addresses; and obtaining system information of the Linux kernel through the security kernel, wherein the system information comprises an interrupt vector table, a process scheduling list, and a memory descriptor of an initial process, and the system information obtained by the security kernel is used to derive the operating state of the Linux kernel.

Specifically, the SafetyOS and the Linux share the same piece of physical memory while operating on different physical memory segments. When the system is operating, the incoming address space is mapped to their respective memory blocks to isolate the operating environment of the two to ensure that the SafetyOS is not affected by the Linux while monitoring the system information of the Linux through the SafetyOS.

Figure 3:
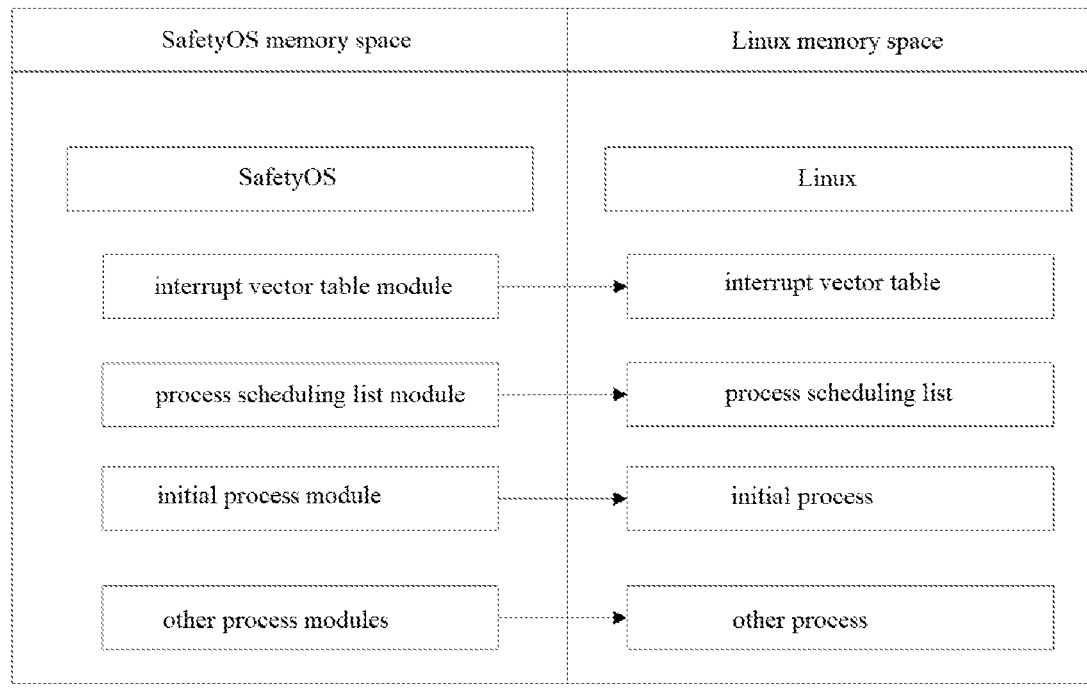
FIG. 3 is a diagram of implementing system monitoring according to an embodiment of the present invention.

As shown in FIG. 3, the SafetyOS may implement system monitoring services through a monitoring module to obtain system information of the Linux. For example, the interrupt vector table (IVT table) of the Linux is acquired through an interrupt vector table module, the process scheduling list (task_list Scheduler) of the Linux may be acquired through a process scheduling list module, the memory descriptor (Mm_struct Init Process) of the initial process of the Linux may be acquired through an initial process module, and other process information of the Linux may be acquired through other process modules. Each of the modules may be a program with corresponding functions.

The SafetyOS may derive the operating state of the Linux through the interrupt vector table, the process scheduling list and the memory descriptor of the initial process of the Linux. The SafetyOS maps the above system information of the Linux to the memory segment managed by the SafetyOS. This information is passed from the Linux to the SafetyOS in the manner of shared memory and inter-core interrupts. Then, the SafetyOS may use this information to derive the operating state of the Linux. For example, the SafetyOS compares interrupt vector values obtained from the Linux and judges a value of 0x00-0x1F, i.e., determining whether the default interrupt vector in the CPU protection mode has changed. If it changes, it is considered that the Linux has crashed.

In the field of robotics, such as industrial welding robots, when it is confirmed that the Linux operating the application that controls the robot's welding action has crashed, the SafetyOS has recorded the process information of Linux at the moment before the crash, and the operator may infer the cause of the failure based on the information recorded by the SafetyOS. Since the recorded information includes the interrupt vector table, the process scheduling list and the memory descriptor of the initial process of the Linux, the cause of the failure may be quickly determined. For example, if it is determined that the failure is caused by an overload of a motor on the robotic arm, the application program that controls the motor may be updated and debugged to improve the stability and safety of subsequent operations. Optionally, the hosting the Linux kernel through the security kernel includes the following steps:

the Linux kernel is hosted by the security kernel according to the system information of the Linux kernel before the abnormality or crash obtained by the security kernel when the Linux kernel runs abnormally or crashes.

Figure 4:
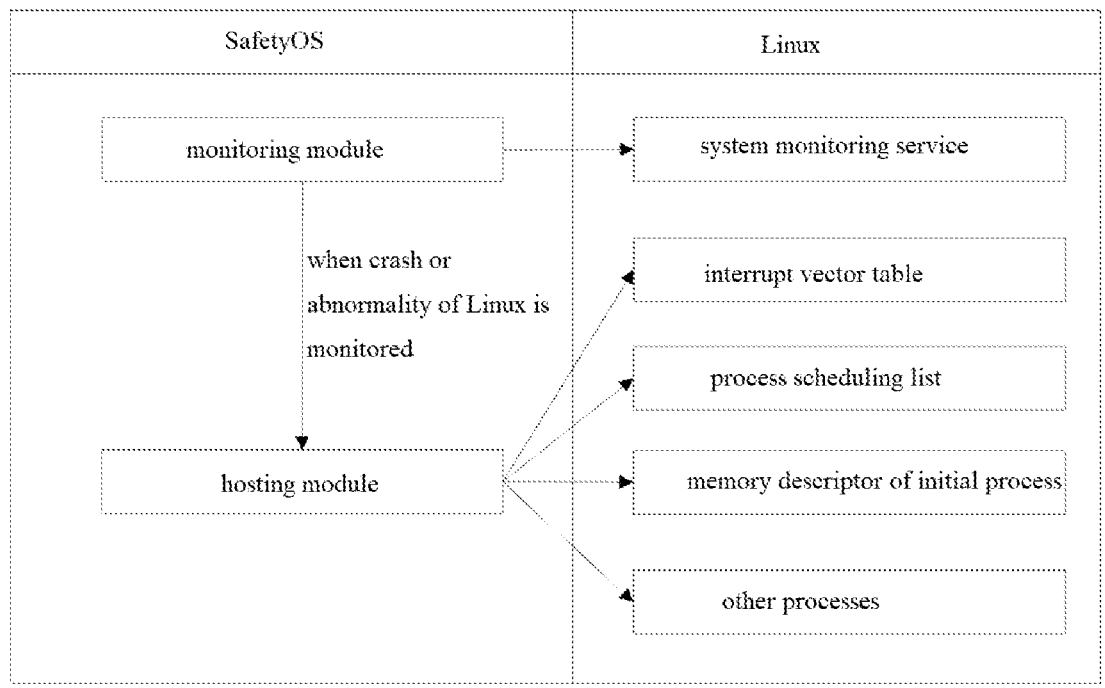
FIG. 4 is a diagram of implementing system custody according to an embodiment of the present invention.

Specifically, as shown in FIG. 4, if a crash or abnormality in Linux is detected while realizing system monitoring service through the monitoring module to record real-time system information of the Linux, the SafetyOS may access and control the interrupt vector table, the process scheduling list, and the memory descriptor of the initial process of the Linux, and other processes through the hosting module to achieve hosting. More specifically, through the above-mentioned system information obtained before the Linux crashes or runs abnormally, the SafetyOS may realize the hosting of various applications operating on the Linux, so as to ensure the safety of the entire system. The information recorded by the SafetyOS may be used to infer the cause of the abnormality or crash of the Linux, which may help improve the stability of the application operating on the robot operating system. The monitoring module includes an interrupt vector table module, a process scheduling list module, an initial process module and other process modules, wherein each of the modules may be a program with corresponding functions.

In the field of robotics, such as industrial welding robots, when it is confirmed that the Linux operating the application that controls the robot's welding action has crashed, the SafetyOS manages the applications operating on the Linux according to the recorded information to avoid process chaos caused by system crashes, for example, arbitrary swinging of the robot arm caused by the error in the process used to control the speed of the robot arm. Since the SafetyOS has recorded the process information of the Linux at the moment before the crash, including the application calling operating system resources, the instructions issued by the operating system to the robotic arm, and the information about the current state of the robotic arm, then the robot arm may maintain the current state of motion according to this information or return slowly and smoothly from the position of the motion state to the safe initial position before starting the welding action during the hosting process. Optionally, the method further includes the following steps:

the Linux kernel is communicated with an external network through the security kernel.

Optionally, the Linux kernel communicating with an external network through the security kernel includes the following steps:

the security kernel receives a data message from the Linux kernel directed to the external network, and forwards the data message to the external network; and the security kernel receives a data message directed to the Linux kernel from the external network, and after filtering through a firewall, forwards the filtered data message to the Linux kernel.

Figure 5:
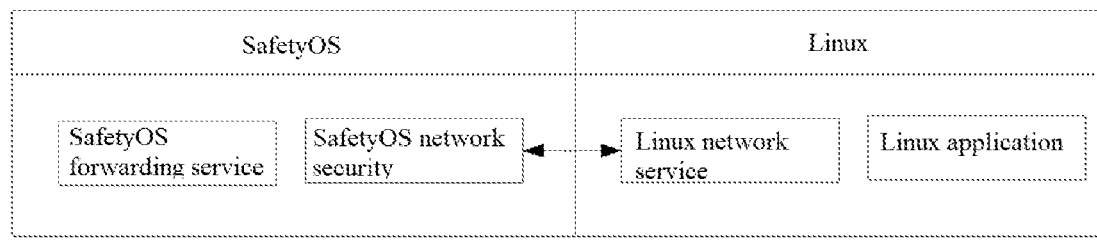
FIG. 5 is a diagram of implementing system information transceiving according to an embodiment of the present invention.

Specifically, as shown in FIG. 5, the SafetyOS may include a SafetyOS forwarding service module and a SafetyOS network security module, and the Linux may include a Linux application module and a Linux network service module. When the Linux application module is required to send a data message to the external network, the Linux network service module sends the data message to the SafetyOS network security module, and then the SafetyOS forwarding service module sends the data message to the external network. When the Linux application module is required to receive a data message from the external network, it is first received by the SafetyOS forwarding service module, and then processed by the SafetyOS network security module such as establishing a firewall to filter various restricted data messages, and then the filtered data message is sent to the Linux network service module and finally to the corresponding Linux application module, so as to effectively prevent network attacks and ensure the overall security of the system.

The Linux application module corresponds to each application program operating on Linux. In the robotics field, each application program may correspond to different setting actions performed by the robot.

In this embodiment, when the robot operating system starts, the safety kernel is started first, i.e., SafetyOS, and after the SafetyOS starts, the Linux kernel of the system is booted, and then then SafetyOS is responsible for allocating the resources of the entire system to Linux. During the startup process of the Linux, the address of the interrupt vector table and the address of the process scheduling list are passed to the SafetyOS in the agreed format through shared memory, and the SafetyOS may dynamically view the operating state of the Linux and obtain relevant information while managing the state of the entire system when the Linux crashes. In addition, the communication between the Linux and external devices is taken over and controlled by SafetyOS; common network attacks may be prevented through the SafetyOS while establishing the firewall to filter various restricted data messages.

In another embodiment of the invention, the above operating system is applied to a robot, and a method for controlling the robot includes the following steps:

a setting action of the robot is executed through the Linux kernel of the robot operating system; and hosting the Linux kernel through the security kernel of the robot operating system based on the above operation method of robot operating system when the Linux kernel runs abnormally or crashes to keep the setting action as the state before the Linux kernel runs abnormally or crashes or return the robot gently to an initial position for executing the setting action.

The setting action includes a welding action of a welding robot, a punching action of a punching robot, and a cutting action of a cutting robot.

Specifically, in the field of robotics, such as industrial robots and weapon robots, the actions they perform are often more dangerous. The setting action of the robot may be controlled through the application program. The application program runs on the operating system. The operating system includes the Linux kernel and the security kernel. More precisely, the application program runs on the Linux kernel. When the robot performs actions such as welding, stamping and cutting based on the application, the application process may be chaotic if the Linux kernel runs abnormally or crashes such that the movements of the robot are out of control. Since the security kernel may monitor the process information of the Linux kernel in real time, and each application program on the Linux kernel is managed according to the recorded process information of the Linux kernel before the crash when the Linux kernel crashes.

For example, a welding robot, in one aspect, the Linux kernel may be hosted through the security kernel, so as to maintain the welding robot arm in the state before the system failure, or turn off the welding gun and slowly return the welding robot arm to the initial position before welding. In another aspect, the operating state of the Linux kernel before the abnormality or crash may be derived from the information about the operating state of the Linux kernel recorded by the security kernel, so as to realize the effective tracking of system failure. For example, the staff may quickly infer the cause of the failure through the process information of the Linux kernel before the failure recorded in the security kernel and debug and upgrade related applications, thereby improving the stability and safety of the overall operation of the system.

In another embodiment of the invention, a computer readable storage medium is stored with computer programs, which, when performed by a processor, achieves the operation method of robot operating system as described above.

Specifically, implementing the operation method of robot operating system may also be executing the following steps:

an operating state of the Linux kernel is monitored through the security kernel when the security kernel and the Linux kernel of the robot operating system are both started;

the Linux kernel is hosted through the security kernel when the Linux kernel runs abnormally or crashes; and optional steps of the operation method of robot operating system in the above embodiments.

In another embodiment of the invention, a computer readable storage medium is stored with computer programs, which, when performed by a processor, achieves the robot control method as described above.

Specifically, implementing the operation method of robot operating system may also be executing the following steps:

a setting action of the robot is executed through the Linux kernel of the robot operating system; and the Linux kernel through the security kernel of the robot operating system is hosted based on the above operation method of robot operating system when the Linux kernel runs abnormally or crashes to keep the setting action as the state before the Linux kernel runs abnormally or crashes or to return the robot gently to an initial position for executing the setting action.

The storage medium may be a magnetic disk, an optical disc, a read only memory (Read Only Memory, ROM), or a random access memory (Random Access Memory, RAM), etc.

The readers should understand that in the description of this specification, descriptions with reference to the terms, such as "one embodiment", "some embodiments", "examples", "specific examples", or "some examples", mean that the specific features, structures, materials or characteristics described in conjunction with the embodiments or examples are included in at least one embodiment or example of the invention. In the present specification, the schematic representation of the above terms does not necessarily mean the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be combined and combined by those skilled in the art without contradicting each other.

Although embodiments of the invention have been shown and described above, it will be understood that the above embodiments are illustrative and are not to be construed as limiting the present invention. Changes, modifications, alterations and variations of the above-described embodiments may be made by those skilled in the art.

What is claimed is:

1. An operation method of robot operating system comprising a security kernel and a Linux kernel that share a physical memory and run on different physical memory addresses respectively, the operation method of robot operating system comprising:

monitoring an operating state of the Linux kernel through the security kernel when the security kernel and the Linux kernel of the robot operating system are both started; and hosting the Linux kernel through the security kernel when the Linux kernel runs abnormally or crashes.

2. The operation method of robot operating system according to claim 1, wherein a startup process of the security kernel and the Linux kernel comprises:

loading a multi-operating system startup program through a basic input/output system;

booting the security kernel to start through the multi-operating system startup program; and booting the Linux kernel to start through the security kernel.

3. The operation method of robot operating system according to claim 2, wherein the step of booting the security kernel to start through the multi-operating system startup program comprises:

parsing an elf file of the security kernel through the multi-operating system startup program; and re-locating each segment of the elf file according to header information of the elf file when a validity of a Multiboot header of the elf file is confirmed, so that the security kernel runs on a first physical memory address of a physical memory.

4. The operation method of robot operating system according to claim 3, wherein the step of booting the Linux kernel to start through the security kernel comprises:

loading the Linux kernel through the security kernel, reading an image file of the Linux kernel from a file system, and decompressing the Linux kernel to a second physical memory address of the physical memory; and loading an initial RAM disk of the Linux kernel to the second physical memory address through the security kernel according to a definition of a boot menu.

5. The operation method of robot operating system according to claim 2, wherein when operating on a multi-core processor comprising a master core and a slave core, the step of booting the Linux kernel to start through the security kernel comprises:

residing the security kernel on the master core, and booting the slave core to load the Linux kernel by the master core.

6. The operation method of robot operating system according to claim 1, wherein the step of monitoring an operating state of the Linux kernel through the security kernel comprises:

the security kernel and the Linux kernel respectively mapping an incoming address space to their own physical memory addresses; and obtaining system information of the Linux kernel through the security kernel, wherein the system information comprises an interrupt vector table, a process scheduling list, and a memory descriptor of an initial process, and the system information obtained by the security kernel is used to derive the operating state of the Linux kernel.

7. The operation method of robot operating system according to claim 6, wherein the step of hosting the Linux kernel through the security kernel comprises:

hosting the Linux kernel by the security kernel according to the system information of the Linux kernel before the abnormality or crash obtained by the security kernel when the Linux kernel runs abnormally or crashes.

8. The operation method of robot operating system according to claim 7, further comprising:

the Linux kernel communicating with an external network through the security kernel.

9. The operation method of robot operating system according to claim 8, wherein the step of the Linux kernel communicating with an external network through the security kernel comprises:
   the security kernel receiving a data message from the Linux kernel directed to the external network, and forwarding the data message to the external network; and
   the security kernel receiving a data message directed to the Linux kernel from the external network, and after filtering through a firewall, forwarding the filtered data message to the Linux kernel.

* * * * *